US007881970B2

(12) United States Patent
Snow

(10) Patent No.: US 7,881,970 B2
(45) Date of Patent: Feb. 1, 2011

(54) METHOD AND SYSTEM FOR ORDERING AND DELIVERING A PRODUCT

(76) Inventor: Richard Snow, 10740 Thornmint Rd., San Diego, CA (US) 92127

( * ) Notice: Subject to any disclaimer, the term of this patent is extended or adjusted under 35 U.S.C. 154(b) by 1315 days.

(21) Appl. No.: 11/365,134

(22) Filed: Mar. 1, 2006

(65) Prior Publication Data
US 2007/0208676 A1 Sep. 6, 2007

(51) Int. Cl.
*G06Q 30/00* (2006.01)
(52) U.S. Cl. .......................................... 705/26; 705/37
(58) Field of Classification Search ................... 705/26, 705/37
See application file for complete search history.

(56) References Cited
U.S. PATENT DOCUMENTS 5,710,641 A * 1/1998 Lowry et al. ................. 358/462
7,561,299 B2 * 7/2009 Elarde et al. ................. 358/1.7

OTHER PUBLICATIONS

Holiday Gifts for Family, Friends and Colleagues, Connecticut Post. Bridgeport, Conn.: Nov. 24, 2004, downloaded from ProQuest Direct on the Internet on Aug. 24, 2010, 5 pages.*

* cited by examiner

*Primary Examiner*—James Zurita

(57) ABSTRACT

A method and system of buying a product for delivery to a specific individual or entity using a customized picture frame which includes selecting and placing an order for a specific item to be prepared and delivered. A photographic image of the provider is transmitted by the entity where the purchase was made to the intended recipient at the time of the order or when the order is ready for delivery. The provider and preparation and delivery entity both have a supply of the customized picture frames, and whoever is making the delivery of the product places the photographic image of the provider in one of these frames in one of several available ways to secure the framed picture along with an accompanying written message to the product for delivery. The framed picture is easily removed from the product and can be placed on a desk or mantle for viewing or used in any other way for the enjoyment of the recipient.

17 Claims, 2 Drawing Sheets

METHOD AND SYSTEM FOR ORDERING AND DELIVERING A PRODUCT

FIELD OF THE INVENTION

The present invention relates to methods and systems of trading wherein products are selected, purchased and delivered with an image of the purchaser attractively displayed in a customized frame that can be removed from the product by the recipient and used independently by the recipient as a display or in other personal ways.

Product selection, purchasing and delivery systems take many forms. For example, the general practice of acknowledging gifts of flowers or other articles associated with the death and funeral of a deceased person has been for the mortician or other designated person to remove the sympathy cards attached to flowers before the funeral is over and thereafter to deliver the collected cards to the deceased's family. Several days or even weeks later, the family sends out acknowledgments by referring to the cards. There is no way at this time that a family member can visualize the gift flowers that were sent or who the sender was other than by name. It may have been years since the family members and senders had last seen each other.

Other conventional systems rely on sending cards with products ordered and sent as gifts by merely identifying the sender names. If the occasion was a birthday or holiday, a particular gift may be one of many received at that time and confusing to the recipient as to which person or family sent what gift. In any event, the recipient may retain only a vague recollection, perhaps inaccurate, of what he or she did receive.

Consequently, there is a need for a method and system that provides easier access to purchasers who wish to purchase consumer products and provide delivery service for those products and convey positive and certain recollection to recipients of those products of the names and appearances of those purchasers. It is to that need that the present invention is directed.

SUMMARY

The present invention includes a method of buying a product for delivery to a specific individual utilizing a customized free standing picture frame which includes selecting and placing an order for a specific item to be prepared and delivered. At the time of the order or when the order is readied for delivery, a photographic image of the provider is transmitted by the entity where the purchase was made directly to the intended recipient or to the preparation and delivery entity that prepares and delivers the product to the intended recipient. The provider and the preparation and delivery entity both have a supply of customized free standing picture frames, and whoever is making the delivery of the product places the photographic image of the provider in one of these frames by one of several different ways to secure the framed picture along with an accompanying written message to the product for delivery. The framed picture is easily removed from the product and can be placed on a desk or mantle for viewing or used in any other way for the enjoyment of the recipient.

The present invention also includes a system incorporating a location for selecting and buying a consumer product, preparation and delivery means for preparing the chosen consumer product together with the customized free standing picture frame, an electronic system transmitting photographic images to be included in the customized free standing picture frame so that the intended final recipient can remove the picture frame holding the photographic images from the chosen consumer product and retain it for personal enjoyment.

Thus there has been outlined the more important features of the invention in order that the detailed description that follows may be better understood and in order that the present contribution to the art may be better appreciated. There are, of course, additional features of the invention that will be described hereinafter and which will form the subject matter of the claims appended hereto. In that respect, before explaining at least one embodiment of the invention in detail, it is to be understood that the invention is not limited in its arrangement of the components set forth in the following description and illustrated in the drawings. The invention is capable of other embodiments and of being practiced and carried out in various ways.

It is also to be understood that the phraseology and terminology employed herein are for the purpose of description and should not be regarded as limiting in any respect. Those skilled in the art will appreciate that the concept upon which this disclosure is based may readily be utilized as a basis for designing other structures, methods and systems for carrying out the several purposes of this development. It is important that the claims be regarded as including such equivalent methods and products resulting therefrom that do not depart from the spirit and scope of the present invention. The application is neither intended to define the invention of the application, which is measured by its claims, nor to limit its scope in any way.

Thus, the objectives of the invention set forth above, along with the various features of novelty, which characterize the invention, are noted with particularity in the claims annexed to and forming a part of this disclosure. For a better understanding of the invention, its operating advantages and the specific results obtained by its use, reference should be made to the following detailed specification taken in conjunction with the accompanying drawings wherein like characters of reference designate like parts throughout the several views.

The drawings are included to provide a further understanding of the invention and are incorporated in and constitute a part of this specification. They illustrate embodiments of the invention and, together with their description, serve to explain the principles of the invention.

DETAILED DESCRIPTION OF THE PREFERRED EMBODIMENT

The method and system of the present invention can be through a single location wherein the product purchase, preparation and delivery is handled by a single entity. It can be from two or more locations where different entities share responsibilities for purchasing, preparation and delivery. For example, the first location entity can be the product seller who places the preparation and delivery responsibilities for the product at a second location different entity.

Figure 1:
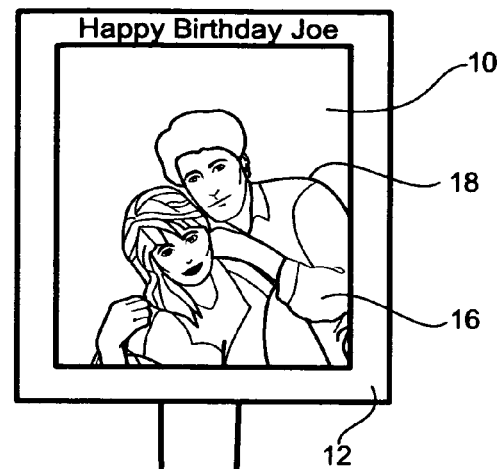
FIG. 1 is a front elevational view of the customized free standing picture frame with a removable attaching pin positioned therewith.
Figure 3:
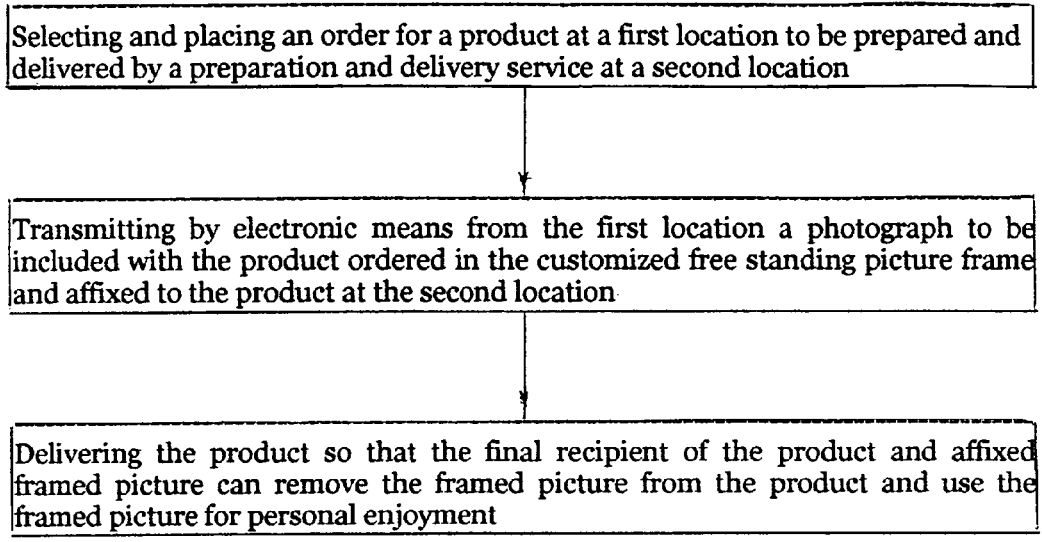
FIG. 3 is a block diagram of one method of the present invention utilizing two different locations.
Figure 4:
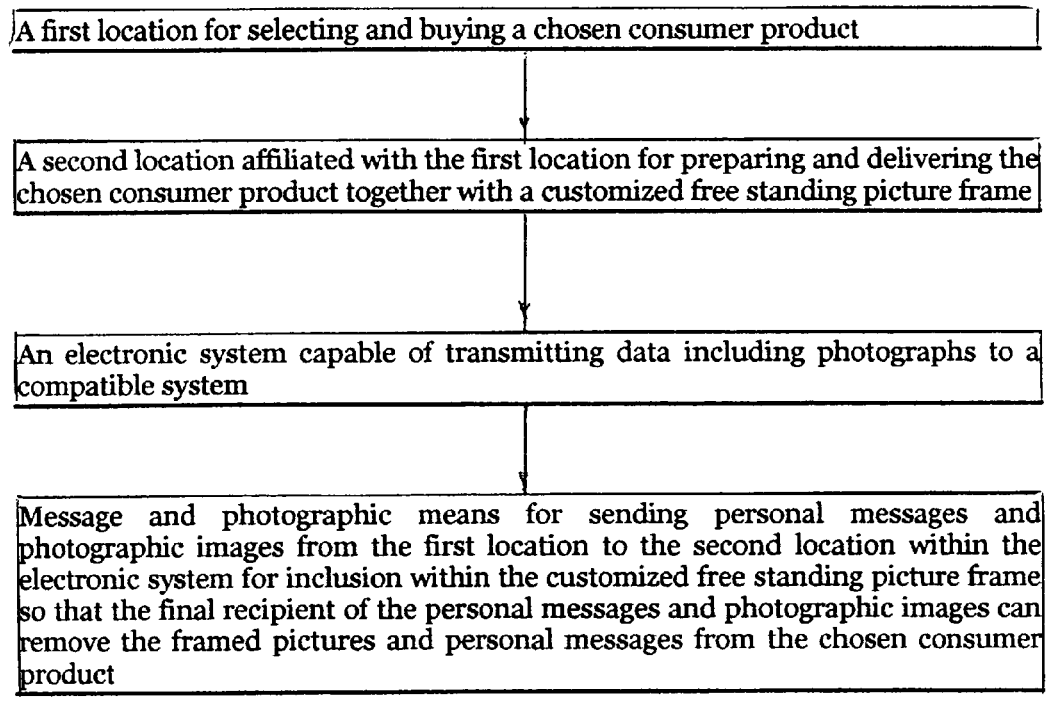
FIG. 4 is a clock diagram of one system of the present invention utilizing a single location.

The front shown generally as 10 of the customized free standing picture frame 12 used in the present invention is shown in FIG. 1. Here a frame 12 surrounds a viewing window 16 where a photographic image 18 displays the sender's or senders' picture. A removable attaching pin 20 releasably secures to frame 12 and has a pointed end suitably designed to be secured to a floral display or other kind of display.

Figure 2:
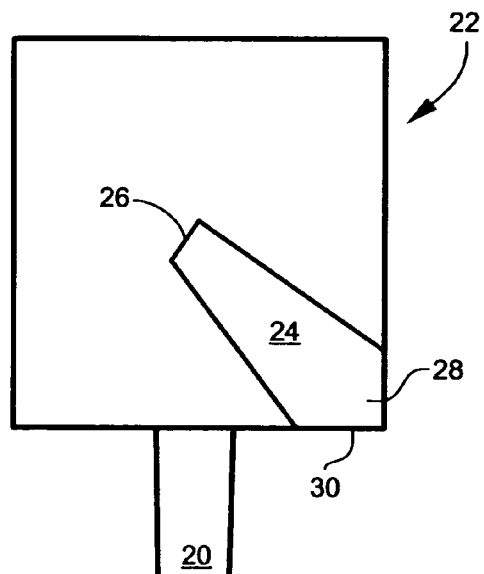
FIG. 2 is a rear elevational view of the customized free standing picture frame with a removable attaching pin positioned therewith.

The back shown generally as 22 of customized free standing picture frame 12 is shown in FIG. 2. Back 22 has a die-cut stand 24 which is hingedly secured along narrow top end 26 so that mounting surface engaging edge 28 swings outwardly away from back 22 and engages the supporting surface along edge 30. When die-cut stand 24 is in the frame display mode, front lo reclines slightly rearwardly in a convention manner.

While not limited to the use of any electronic system, photographic images utilized in the present invention are ideally made and transmitted by cell phones having photographic capability. The pictures can be quickly made and dispatched and have high resolution. While cell phones are convenient and quickly activated, there is no intent to isolate the invention to cell phones only. Any device capable of transmitting intelligence and images may be used.

The method and system of the present invention relate to the sale and delivery of consumer products and are particularly well-suited for the sale and delivery of gifts such as flowers or floral arrangements. While a number of references are made to the sale and delivery of flowers and floral arrangements, it should be understood that the method and system of the present invention may be used for selling and delivering other consumer products including, for example, food, toys, clothes, accessories and others.

From the preceding description, it can be seen that a method and system for buying and delivering consumer products has been provided that will meet all of the advantages of prior art devices and offer additional advantages not heretofore achievable. With respect to the foregoing invention, the optimum dimensional relationship to the parts of the invention including variations in size, materials, shape, form, function, and manner of operation, use and assembly are deemed readily apparent to those skilled in the art, and all equivalent relationships illustrated in the drawings and described in the specification are intended to be encompassed herein.

The foregoing is considered as illustrative only of the principles of the invention. Numerous modifications and changes will readily occur to those skilled in the art, and it is not desired to limit the invention to the exact construction and operation shown and described. All suitable modifications and equivalents that fall within the scope of the appended claims are deemed within the present inventive concept.

What is claimed is:

1. A method of providing a product in combination with a releasably affixed customized free standing picture frame, the method comprising the steps of: transmitting by electronic means a photograph to be included with said product; providing a customized free standing picture frame; placing said photograph in said customized free standing picture frame; releasably affixing said customized free standing picture frame to said product; and thereby providing said product with the framed photograph releasably attached to said product.

2. The method as claimed in claim 1, further comprising transmitting by electronic means a personal message with said photograph.

3. A method of providing a product for delivery to a specific entity utilizing a customized free standing picture frame, the method comprising selecting and placing an order for a product at the first location; transmitting by electronic means from the first location to a second location a photograph to be included with said product; providing a customized free standing picture frame at the second location; placing said photograph in said customized free standing picture frame; releasably affixing the resulting customized free standing picture frame to said product at the second location; and thereby providing said product with the framed photograph releasably affixed to said product.

4. The method as claimed in claim 3 further comprising transmitting a personal message with said photograph.

5. A buying and delivery system for buying and delivering a consumer product, the system comprising: a first location for selecting and buying a chosen consumer product; a second location affiliated with the first location for preparing and delivering the chosen consumer product together with a releasably affixed customized free standing picture frame; an electronic system capable of transmitting data including photographs to a compatible electronic system; said electronic system capable of sending personal messages and photographic images from the first location to the second location for inclusion with the customized free standing picture frame, so that the final recipient of the personal messages and photographic images can remove the framed photograph and personal messages from the chosen consumer product.

6. The method as claimed in claim 1, wherein the product is a floral arrangement.

7. The method as claimed in claim 1, wherein the recipient of the product can retain the releasably affixed framed picture.

8. The method as claimed in claim 3, wherein the recipient of the product can retain the releasably affixed framed picture.

9. The method as claimed in claim 3, wherein the product is a floral arrangement.

10. The method as claimed in claim 4, wherein the product is a floral arrangement.

11. The system as claimed in claim 5, wherein the consumer product is a floral arrangement.

12. A buying and delivery system for buying and delivering a consumer product, the system comprising: a first location for selecting and buying a chosen consumer product; a system for preparing and delivering the chosen consumer product together with a releasably affixed customized free standing picture frame; an electronic system capable of transmitting data including photographs to a compatible electronic system; a photographic system for sending photographic images to the preparation and delivery system for inclusion within the customized free standing picture frame capable of providing the final recipient with the chosen consumer product and photographic image having a releasably affixed picture frame holding the photographic image.

13. The system as claimed in claim 12 wherein the photographic system is capable of sending non-photographic messages.

14. The system as claimed in claim 12 wherein the preparation and delivery system is at a second location.

15. The system as claimed in claim 12 wherein the chosen consumer product is a floral arrangement.

16. The system as claimed in claim 13 wherein the chosen consumer product is a floral arrangement.

17. The system as claimed in claim 14 wherein the chosen consumer product is a floral arrangement.

\* \* \* \* \*